(12) United States Patent
Sutoh et al.

(10) Patent No.: US 9,227,183 B2
(45) Date of Patent: Jan. 5, 2016

(54) MICROPARTICLES AND CURABLE ORGANOPOLYSILOXANE COMPOSITION CONTAINING THE SAME

(71) Applicant: Dow Corning Toray Co., Ltd., Tokyo (JP)

(72) Inventors: Manabu Sutoh, Ichihara (JP); Kouichi Ozaki, Ichihara (JP); Toru Imaizumi, Ichihara (JP); Dorab Edul Bhagwagar, Saginaw, MI (US); Toyohiko Fujisawa, Ichihara (JP)

(73) Assignees: DOW CORNING TORAY CO., LTD., Tokyo (JP); DOW CORNING CORPORATION, Midland, MI (US)

( * ) Notice: Subject to any disclaimer, the term of this patent is extended or adjusted under 35 U.S.C. 154(b) by 0 days.

(21) Appl. No.: 14/417,476

(22) PCT Filed: Jul. 26, 2013

(86) PCT No.: PCT/JP2013/070955
§ 371 (c)(1),
(2) Date: Jan. 26, 2015

(87) PCT Pub. No.: WO2014/017671
PCT Pub. Date: Jan. 30, 2014

(65) Prior Publication Data
US 2015/0246349 A1     Sep. 3, 2015

(30) Foreign Application Priority Data

Jul. 27, 2012  (JP) ................ 2012-167360

(51) Int. Cl.
| | |
|---|---|
| *B01J 33/00* | (2006.01) |
| *C08G 77/08* | (2006.01) |
| *B01J 23/42* | (2006.01) |
| *B01J 23/96* | (2006.01) |
| *C08K 9/10* | (2006.01) |
| *C09J 183/04* | (2006.01) |
| *C08L 83/04* | (2006.01) |
| *G03G 9/087* | (2006.01) |
| *C09J 183/14* | (2006.01) |
| *B01J 35/02* | (2006.01) |
| *B01J 37/00* | (2006.01) |
| *B01J 31/06* | (2006.01) |
| *B01J 31/28* | (2006.01) |
| *C08G 77/12* | (2006.01) |
| *C08G 77/20* | (2006.01) |

(52) U.S. Cl.
CPC *B01J 33/00* (2013.01); *B01J 23/42* (2013.01); *B01J 23/96* (2013.01); *B01J 31/06* (2013.01); *B01J 31/28* (2013.01); *B01J 35/023* (2013.01); *B01J 35/026* (2013.01); *B01J 37/0045* (2013.01); *C08G 77/08* (2013.01); *C08K 9/10* (2013.01); *C08L 83/04* (2013.01); *C09J 183/04* (2013.01); *C09J 183/14* (2013.01); *G03G 9/08782* (2013.01); *C08G 77/12* (2013.01); *C08G 77/20* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 4,766,176 A | 8/1988 | Lee et al. | |
| 4,784,879 A | 11/1988 | Lee et al. | |
| 4,874,667 A | 10/1989 | Lee et al. | |
| 5,017,654 A * | 5/1991 | Togashi et al. | 525/100 |
| 5,135,960 A * | 8/1992 | Higuchi et al. | 521/76 |
| 5,494,750 A * | 2/1996 | Fujioka et al. | 428/402.21 |
| 6,140,446 A * | 10/2000 | Fujiki et al. | 528/15 |
| 6,224,793 B1 | 5/2001 | Hoffman et al. | |
| 7,307,193 B2 * | 12/2007 | Kobayashi | 568/687 |
| 2008/0262157 A1 | 10/2008 | Nakata et al. | |

FOREIGN PATENT DOCUMENTS

| | | |
|---|---|---|
| EP | 0 339 803 A1 | 11/1989 |
| EP | 0 363 006 A2 | 4/1990 |
| EP | 459 464 A2 * | 12/1991 |
| JP | S 64-45468 A | 2/1989 |
| JP | S 64-47442 A | 2/1989 |
| JP | S 64-51140 A | 2/1989 |
| JP | H 02-9440 A | 1/1990 |
| JP | H 02-117960 A | 5/1990 |
| JP | H 07-026147 A | 1/1995 |
| JP | H 07-070442 A | 3/1995 |
| JP | H 11-236508 A | 8/1999 |
| JP | 2002-069193 A | 3/2002 |
| JP | 2006-002093 A | 1/2006 |
| WO | WO 2005/123839 A1 | 12/2005 |

(Continued)

OTHER PUBLICATIONS

"Plastics Technology Handbook" Chanda et al. (2006) CRC Press, pp. 1 and 2.*

(Continued)

*Primary Examiner* — Marc Zimmer
(74) *Attorney, Agent, or Firm* — Howard & Howard Attorneys PLLC

(57) ABSTRACT

The present invention relates to microparticles comprising: at least one type of a platinum-based catalyst; and a thermoplastic polyolefin resin with a Z-average (Mz) of a weight average molecular weight (Mw) of at least 2500 and Mz/Mw of not more than 2.0, wherein the platinum-based catalyst is dispersed in the thermoplastic polyolefin resin. The microparticles make it possible to obtain a one-component curable organopolysiloxane composition having characteristics such as excellent storage stability.

16 Claims, No Drawings

(56) References Cited

FOREIGN PATENT DOCUMENTS

| WO | WO 2007/032481 A1 | 3/2007 |
| WO | WO 2010/115783 A2 | 10/2010 |

OTHER PUBLICATIONS

International Search Report for Application No. PCT/JP2013/070955 dated Oct. 16, 2013, 4 pages.
English language abstract not found for JPS 64-45468; however, see English language equivalent U.S. Pat. No. 4,766,176. Original document extracted from espacenet.com on Jan. 29, 2015, 14 pages.
English language abstract for JPS 64-47442 extracted from espacenet.com database on Jan. 29, 2015, 1 page.
English language abstract for JPS 64-51140 extracted from espacenet.com database on Jan. 29, 2015, 1 page.
English language abstract for JPH 02-9440 extracted from espacenet.com database on Jan. 29, 2015, 1 page.
English language abstract not found for JPH 02-117960; however, see English language equivalent EP 0 363 006. Original document extracted from espacenet.com on Jan. 29, 2015, 10 pages.
English language abstract and machine-assisted English translation for JPH 07-026147 extracted from the PAJ database on Jan. 29, 2015, 20 pages.
English language abstract and machine-assisted English translation for JPH 07-070442 extracted from the PAJ database on Jan. 29, 2015, 18 pages.
English language abstract and machine-assisted English translation for JPH 11-236508 extracted from the PAJ database on Jan. 29, 2015, 26 pages.
English language abstract and machine-assisted English translation for JP 2002-069193 extracted from the PAJ database on Jan. 29, 2015, 23 pages.
English language abstract for JP 2006-002093 extracted from espacenet.com database on Jan. 29, 2015, 1 page.
English language abstract for WO 2007/032481 extracted from espacenet.com database on Jan. 29, 2015, 1 page.

* cited by examiner

MICROPARTICLES AND CURABLE ORGANOPOLYSILOXANE COMPOSITION CONTAINING THE SAME

RELATED APPLICATIONS

This application is the National Stage of International Patent Application No. PCT/JP2013/070955, filed on Jul. 26, 2013, which claims priority to and all the advantages of Japanese Patent Application No. 2012-167360, filed on Jul. 27, 2012, the content of which is incorporated herein by reference.

TECHNICAL FIELD

The present invention relates to microparticles containing a platinum-based catalyst and a thermoplastic resin, the platinum-based catalyst being dispersed in the thermoplastic resin, and to a curable organopolysiloxane composition with excellent storage stability containing the microparticles.

Priority is claimed on Japanese Patent Application No. 2012-167360, filed on Jul. 27, 2012, the content of which is incorporated herein by reference.

BACKGROUND ART

In order to cure certain types of compositions, contact between a curable component contained in the composition and a catalyst is sometimes necessary. For example, in the case of a hydrosilylation reaction-curable organopolysiloxane composition, the curable component in the composition is crosslinked by a hydrosilylation reaction catalyst such as a platinum-based catalyst, but curing begins when the catalyst and the curable component come into contact, so it may be necessary to prevent the catalyst and the curable component from coming into contact with one another during storage, for example, until curing is required.

One mode for avoiding contact between the catalyst and the curable component is a so-called two-component composition, a first part of which contains the catalyst and a second part of which contains the curable component. However, two-component compositions have poor workability due to the need to mix the two components immediately before use, for example. Moreover, two-component compositions are complicated to handle and sometimes even require a complex device for mixing.

Therefore, so-called one-component compositions have been proposed in which the catalyst and the curable component are present in the same system. In a one-component composition, the catalyst is coated or micro-encapsulated to ensure that the catalyst and the curable component do not come into contact. For example, Japanese Unexamined Patent Application Publication Nos. S64-45468, S64-47442, S64-51140, H02-9440, H02-117960, H07-26147, H07-70442, H11-236508, 2006-002093 and WO2007/032481 disclose one-component curable organopolysiloxane compositions containing a platinum-based catalyst enclosed in a thermoplastic resin such as polyethylene, polystyrene, or a silicone polymer.

However, the present inventors discovered that such one-component curable organopolysiloxane compositions containing so-called encapsulated catalysts have problems in that the storage stability over time is insufficient and in that increases in the viscosity of the composition over time cannot be sufficiently avoided. For example, in a conventional one-component curable organopolysiloxane composition, it has been observed that the platinum-based catalyst and the polysiloxane component come into contact during storage and that changes occur over time due to a hydrosilylation reaction. The viscosity of the composition increases as a result, which causes the composition to cure.

Accordingly, an object of the present invention is to obtain an encapsulated catalyst with which a one-component curable organopolysiloxane composition can demonstrate better storage stability.

Another object of the present invention is to obtain a one-component curable organopolysiloxane composition which demonstrates favorable storage stability by avoiding increases in viscosity over time.

DISCLOSURE OF INVENTION

The first object of the present invention is achieved by microparticles comprising at least one type of a platinum-based catalyst and a thermoplastic polyolefin resin with a Z-average (Mz) of the weight average molecular weight (Mw) of at least 2500 and Mz/Mw of not more than 2.0, wherein the platinum-based catalyst is dispersed in the thermoplastic polyolefin resin.

A melting point of the thermoplastic polyolefin resin is preferably from 40 to 200° C.

The thermoplastic polyolefin resin is preferably a polyolefin wax.

The polyolefin wax is preferably selected from the group consisting of polyethylene waxes, polypropylene waxes, polybutene waxes, and combinations thereof.

An average particle diameter of the microparticles is preferably from 0.01 to 500 μm.

The catalyst is preferably a hydrosilylation reaction catalyst.

A content of the platinum metal in the catalyst is preferably from 0.01 to 50.0 weight %.

The second object of the present invention is achieved by a curable organopolysiloxane composition comprising:

(A) an organopolysiloxane represented by the average unit formula:

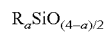

$$R_aSiO_{(4-a)/2}$$

wherein, R is a substituted or unsubstituted monovalent hydrocarbon group, and "a" is a number from 1.0 to 2.3, and having at least an average of 1.5 alkenyl groups in a molecule;

(B) an organopolysiloxane having at least an average of 1.5 silicon-bonded hydrogen atoms in a molecule; and (C) the microparticles.

A content of component (B) is preferably in an amount such that a quantity of silicon-bonded hydrogen atoms in component (B) is from 0.05 to 20 mol per 1 mol of alkenyl groups in component (A).

A content of component (C) is preferably in an amount to promote crosslinking of the composition by a hydrosilylation reaction.

The composition may further comprise (D) a reaction inhibitor in an amount of from 0.001 to 5 parts by weight per 100 parts by weight of component (A).

EFFECTS OF INVENTION

The microparticles of the present invention containing a platinum-based catalyst and a thermoplastic polyolefin resin make it possible to obtain a one-component curable organopolysiloxane composition having characteristics such as excellent storage stability. For example, a curable organosiloxane composition containing the microparticles of the present invention has the feature that the composition can be cured at a low temperature while demonstrating favorable storage stability, with minimal increases in viscosity over time.

DETAILED DESCRIPTION OF THE INVENTION

As a result of dedicated research, the present inventors discovered that the storage stability of a one-component curable organopolysiloxane composition containing an encapsulated catalyst depends on the characteristics related to the molecular weight of the thermoplastic polyolefin resin used in the encapsulation of the platinum-based catalyst. Therefore, in the present invention, an encapsulated catalyst which avoids contact over time and does not cause increases in viscosity over time is provided by controlling the characteristics related to the molecular weight of the material encapsulating the platinum-based catalyst. Specifically, the present invention uses a thermoplastic polyolefin resin with a Z-average (Mz) of the weight average molecular weight (Mw) of at least 2500 and Mz/Mw of not more than 2.0. The Z-average (Mz) of the weight average molecular weight (Mw) is preferably at least 3000, at least 3100, at least 3200, at least 3300, at least 3400, at least 3500, or at least 3600. In addition, the Z-average (Mz) of the weight average molecular weight (Mw) is preferably not more than 7300, not more than 7500, not more than 8500, not more than 10,000, or not more than 15,000. Mz/Mw is preferably not more than 1.9, not more than 1.8, not more than 1.7, not more than 1.6, not more than 1.5, not more than 1.4, not more than 1.3, or not more than 1.2.

The molecular weight and molecular weight distribution are measured using gel permeation chromatography (GPC). Gel permeation chromatography (GPC) is a type of liquid chromatography for separating molecules based on differences in molecular size and is a technique for measuring the molecular weight distribution and the average molecular weight distribution of a polymer substance. When a sample solution is injected into a column filled with a pulverized gel having fine pores of approximately the same size as the size of polymer chains in a dilute solution (hydrodynamic volume), molecules with high molecular weights—that is, molecules with large molecular sizes in the solution—move into the column and are eluted more quickly than molecules with low molecular weights (size separation), with little permeation into the fine pores of the gel surface. Based on this separation mechanism, GPC is generally called size exclusion chromatography (SEC). In the present invention, GPC is performed under the following conditions.

The weight average molecular weight (Mw) determined by GPC was $\Sigma(Ni \cdot Mi^2)/\Sigma(Ni \cdot Mi)$. In this formula, Mi is the molecular weight of each elution position of a GPC curve obtained via a molecular weight calibration curve (created by measuring monodispersed polystyrene with a known molecular weight and making a third-order approximation of the relationship with the elution time and the molecular weight), and Ni is the number of molecules.

The Z-average (Mz) of the weight average molecular weight determined by GPC is $\Sigma(Ni \cdot Mi^3)/\Sigma(Ni \cdot Mi^2)$. Mi and Ni are as described above.

The thermoplastic polyolefin resin used in the present invention is not particularly limited as long as the resin does not inhibit the action of the platinum-based catalyst, but a polyolefin wax is preferable. A preferable wax is selected from the group consisting of polyethylene waxes, polypropylene waxes, polybutene waxes, and combinations thereof. An example of a polyethylene wax is POLYWAX (registered trademark) produced by Baker Hughes Inc. POLYWAX 1000 or POLYWAX 2000 is preferable.

A melting point of the thermoplastic polyolefin resin used in the present invention is not particularly limited, but the upper limit is preferably 200° C., even more preferably 150° C., and particularly preferably 130° C. On the other hand, the lower limit is preferably 40° C., even more preferably 60° C., and particularly preferably 80° C. This is because if the melting point of thermoplastic polyolefin resin is less than the lower limit described above, it will be necessary to prepare and store the microparticles at a low temperature, whereas if the melting point exceeds the upper limit described above, there is a risk that it may not be possible to sufficiently cure a curable organopolysiloxane composition containing the thermoplastic polyolefin resin at a relatively low temperature. The melting point can be measured with any known method. For example, the endothermic peak value resulting from melting at the time of measurement under heating conditions of 5° C./minute using a differential scanning calorimeter (DSC) is used as the melting point.

Although an average particle diameter of the microparticles of the present invention is not particularly limited, the upper limit is preferably 500 μm, even more preferably 200 μm, and particularly preferably 100 μm, 50 μm, 30 μm, 20 μm, 10 μm, or 5 μm. On the other hand, the lower limit is preferably 0.01 μm, even more preferably 0.05 μm, and particularly preferably 0.1 μm, 0.5 μm, or 1 μm. This is because if the

TABLE 1

| | | | |
|---|---|---|---|
| Apparatus: | Gel permeation liquid chromatography GPC (PL-220) | | (Polymer Laboratories) |
| Detector: | Differential refractive index detector RI | | (Polymer Laboratories) |
| Column: | Shodex HT806M (2 columns) | | (Showa Denko K.K.) |
| Solvent: | 1,2,4-trichlorobenzene (TCB) Containing 0.1% BHT | | (Wako Pure Chemical Industries, Ltd.) |
| Flow rate: | 1.0 mL/min | | |
| Column temperature: | 140° C. | | |
| Sample: | [Dissolution method] | 10 mL of a measurement solvent was added to 10 mg of the sample and stirred while heating for 20 minutes at 120° C. | |
| | [Concentration] | Approximately 0.1% | |
| | [Solubility] | Good (confirmed visually) | |
| | [Filtration] | Filtration was performed with a 0.5 μm filter (made by Waters). | |
| Injection rate: | 0.200 mL | | |
| Standard sample: | Standard polystyrene | | | average particle diameter is less than the lower limit described above, the resulting thermoplastic polyolefin resin particles themselves will become prone to agglomeration, making the microparticles difficult to disperse in the curable organopolysiloxane composition. On the other hand, if the average particle diameter exceeds the upper limit described above, the dispersibility of the catalyst will be diminished when the curable organopolysiloxane composition containing the microparticles is heated, which will make it impossible to achieve the uniform curing of the composition.

The platinum-based catalyst used in the present invention may be a solid or a liquid at room temperature. A type of the catalyst is not particularly limited, but preferable catalysts are hydrosilylation reaction catalysts such as platinum catalysts such as platinum black, platinum-supported alumina powders, platinum-supported silica powders, platinum-supported carbon powders, chloroplatinic acids, alcohol solutions of chloroplatinic acids, complexes of platinum and olefin, complexes of platinum and alkenyl siloxanes such as divinyltetramethyldisiloxane, and catalysts prepared by further diluting a complex of platinum and an alkenyl siloxane with an alkenyl siloxane, a siloxane oligomer, or the like; palladium-based catalysts such as tetrakis(triphenylphosphine)palladium; and rhodium-based catalysts.

A content of the platinum metal in the platinum-based catalyst contained in the microparticles of the present invention is, for example, from 0.01 to 50 weight %, from 0.03 to 25 weight %, from 0.06 to 15 weight %, from 0.09 to 9 weight %, from 0.1 to 8.0 weight %, from 0.15 to 6.0 weight %, from 0.17 to 3.0 weight %, from 0.18 to 2 weight %, or from 0.2 to 1.0 weight %.

A production method of the microparticles of the present invention is not particularly limited. For example, it is possible to employ a chemical method such as a conventionally known interfacial polymerization method or an in-situ polymerization method; a physicochemical method such as a coacervation method or a liquid drying method; or a physical/mechanical method such as a spray drying method. The production of the microparticles of the present invention is particularly preferably realized by a spray drying method. The resulting microparticles may be washed with a solvent such as isopropyl alcohol or ethanol or may remain unwashed.

Next, the curable organopolysiloxane composition of the present invention will be described in detail hereinafter.

Component (A), which is a base compound of the present composition, is an organopolysiloxane represented by the average unit formula: $R_aSiO_{(4-a)/2}$ and having at least an average of 1.5 alkenyl groups in a molecule. In the formula above, R is a substituted or unsubstituted monovalent hydrocarbon group, and examples of this monovalent hydrocarbon group include alkyl groups such as methyl groups, ethyl groups, propyl groups, butyl groups, pentyl groups, and hexyl groups; alkenyl groups such as vinyl groups, allyl groups, butenyl groups, pentenyl groups, hexenyl groups, and heptenyl groups; aryl groups such as phenyl groups, tolyl groups, and xylyl groups; aralkyl groups such as benzyl groups and phenethyl groups; and halogenated alkyl groups such as 3-chloropropyl groups and 3,3,3-trifluoropropyl groups. Here, at least an average of 1.5 groups of R in a molecule are alkenyl groups such as those described above. Vinyl groups and hexenyl groups are preferable as the alkenyl groups. Methyl groups and phenyl groups are preferable as silicon-bonded groups other than the alkenyl groups. In the formula above, "a" is a number from 1.0 to 2.3. Examples of molecular structures of such component (A) include a straight chain structure, a partially branched straight chain structure, a branched chain structure, a reticulated structure, and a dendritic structure. Component (A) may be a mixture of two or more types of organopolysiloxanes having these molecular structures. That is, a may be either $1 \leq a < 2$ or $2 \leq a < 2.3$. A viscosity at 25° C. of component (A) is not particularly limited but is preferably within the range of from 50 to 1,000,000 mPa·s and particularly preferably within the range of from 100 to 500,000 mPa·s.

Examples of the organopolysiloxane for component (A) include dimethylsiloxane-methylvinylsiloxane copolymers capped at both molecular terminals with trimethylsiloxy groups, methylvinylpolysiloxanes capped at both molecular terminals with trimethylsiloxy groups, methylvinylsiloxane-methylphenylsiloxane copolymers capped at both molecular terminals with trimethylsiloxy groups, dimethylsiloxane-methylvinylsiloxane-methylphenylsiloxane copolymers capped at both molecular terminals with trimethylsiloxy groups, dimethylpolysiloxanes capped at both molecular terminals with dimethylvinylsiloxy groups, methylvinylpolysiloxanes capped at both molecular terminals with dimethylvinylsiloxy groups, methylphenylpolysiloxanes capped at both molecular terminals with dimethylvinylsiloxy groups, dimethylsiloxane-methylvinylsiloxane copolymers capped at both molecular terminals with dimethylvinylsiloxy groups, methylvinylsiloxane-methylphenylsiloxane copolymers capped at both molecular terminals with dimethylvinylsiloxy groups, methylvinylsiloxane-diphenylsiloxane copolymers capped at both molecular terminals with dimethylvinylsiloxy groups, methylvinylpolysiloxanes capped at one molecular terminal with a trimethylsiloxy group and the other molecular terminal with a dimethylvinylsiloxy group, dimethylsiloxane-methylvinylsiloxane copolymers capped at one molecular terminal with a trimethylsiloxy group and the other molecular terminal with a dimethylvinylsiloxy group, organopolysiloxanes comprising a unit represented by the formula: $R_3SiO_{1/2}$ and a unit represented by the formula: $SiO_{4/2}$, organopolysiloxanes comprising a unit represented by the formula: $RSiO_{3/2}$, organopolysiloxanes comprising a unit represented by the formula: $R_2SiO_{2/2}$ and a unit represented by the formula: $RSiO_{3/2}$, organopolysiloxanes comprising a unit represented by the formula: $R_2SiO_{2/2}$, a unit represented by the formula: $RSiO_{3/2}$, and a unit represented by the formula: $SiO_{4/2}$, and mixtures of two or more types of these organopolysiloxanes. R in the formulas above is a substituted or unsubstituted monovalent hydrocarbon group as described above.

As the organopolysiloxane for component (A), it is also possible to use an organopolysiloxane mixture with an average number of 1.5 alkenyl groups in a molecule by mixing an organopolysiloxane listed above having at least 2 alkenyl groups in a molecule and an organopolysiloxane listed below having no alkenyl groups or having less than 2 alkenyl groups in a molecule. Examples of such an organopolysiloxane having no alkenyl groups or having less than 2 alkenyl groups in a molecule include dimethylpolysiloxanes capped at one molecular terminal with a dimethylvinylsiloxy group and the other molecular terminal with a trimethylsiloxy group, methylphenylpolysiloxanes capped at one molecular terminal with a dimethylvinylsiloxy group and the other molecular terminal with a trimethylsiloxy group, dimethylsiloxane-methylvinylsiloxane copolymers capped at both molecular terminals with trimethylsiloxy groups and having 1 vinyl group on the molecular side chains, dimethylpolysiloxanes capped at both molecular terminals with trimethylsiloxy groups, and methylphenylpolysiloxanes capped at both molecular terminals with trimethylsiloxy groups.

Component (B) is a crosslinking agent of the present composition and is an organopolysiloxane having at least an average of 1.5 silicon-bonded hydrogen atoms in a molecule. It is particularly preferable for there to be at least an average of 2 silicon-bonded hydrogen atoms in a molecule. The bonding sites of the silicon-bonded hydrogen atoms are not particularly limited and may be molecular terminals, molecular side chains, or molecular terminals and molecular side chains, for example. Examples of silicon-bonded groups other than hydrogen atoms include substituted or unsubstituted monovalent hydrocarbon groups excluding alkenyl groups such as alkyl groups such as methyl groups, ethyl groups, propyl groups, butyl groups, pentyl groups, and hexyl groups; allyl groups such as phenyl groups, tolyl groups, and xylyl groups; aralkyl groups such as benzyl groups and phenethyl groups; and halogenated alkyl groups such as 3-chloropropyl groups and 3,3,3-trifluoropropyl groups as well as alkoxy silyl alkyl groups such as trimethoxysilylethyl groups, methyldimethoxysilylethyl groups, triethoxysilylethyl groups, and trimethoxysilylpropyl groups; alkoxy groups such as methoxy groups, ethoxy groups, propoxy groups, and glycidoxy alkyl groups such as glycidoxypropyl groups and glycidoxybutyl groups. Examples of molecular structures of such component (B) include a straight chain structure, a partially branched straight chain structure, a branched chain structure, a reticulated structure, and a dendritic structure. Component (B) may be a mixture of two or more types of organopolysiloxanes having these molecular structures. A viscosity at 25° C. of component (B) is not particularly limited but is preferably within the range of from 1 to 500,000 mPa·s and particularly preferably within the range of from 1 to 1,000 mPa·s.

Examples of the organopolysiloxane for component (B) include methylhydrogenpolysiloxanes capped at both molecular terminals with trimethylsiloxy groups, dimethylsiloxane-methylhydrogensiloxane copolymers capped at both molecular terminals with trimethylsiloxy groups, methylhydrogensiloxane-methylphenylsiloxane copolymers capped at both molecular terminals with trimethylsiloxy groups, dimethylsiloxane-methylhydrogensiloxane-methylphenylsiloxane copolymers capped at both molecular terminals with trimethylsiloxy groups, dimethylpolysiloxanes capped at both molecular terminals with dimethylhydrogensiloxy groups, methylhydrogenpolysiloxanes capped at both molecular terminals with dimethylhydrogensiloxy groups, dimethylsiloxane-methylhydrogensiloxane copolymers capped at both molecular terminals with dimethylhydrogensiloxy groups, dimethylsiloxane-methylphenylsiloxane copolymers capped at both molecular terminals with dimethylhydrogensiloxy groups, dimethylsiloxane-methylhydrogensiloxane-methylphenylsiloxane copolymers capped at both molecular terminals with dimethylhydrogensiloxy groups, organopolysiloxanes comprising a unit represented by the formula: $R'_3SiO_{1/2}$ and a unit represented by the formula: $SiO_{4/2}$, organopolysiloxanes comprising a unit represented by the formula: $R'_{3/2}$, organopolysiloxanes comprising a unit represented by the formula: $R'_2SiO_{2/2}$ and a unit represented by the formula: $R'SiO_{3/2}$, organopolysiloxanes comprising a unit represented by the formula: $R'_2SiO_{2/2}$, a unit represented by the formula: $R'SiO_{3/2}$, and a unit represented by the formula: $SiO_{4/2}$, methylhydrogensiloxane-methyl(trimethoxysilylethyl)siloxane copolymers capped at both molecular terminals with trimethylsiloxy groups, methylhydrogensiloxane-methyl(trimethoxysilylethyl)siloxane-methyl(3-glycidoxypropyl)siloxane copolymers capped at both molecular terminals with trimethylsiloxy groups, dimethylsiloxane-methylhydrogensiloxane-methyl(trimethoxysilylethyl)siloxane copolymers capped at both molecular terminals with trimethylsiloxy groups, dimethylsiloxane-methylhydrogensiloxane-methyl(trimethoxysilylethyl) siloxane-methyl(3-glycidoxypropyl)siloxane copolymers capped at both molecular terminals with trimethylsiloxy groups, methylhydrogensiloxane-methyl(triethoxysilylethyl)siloxane copolymers capped at both molecular terminals with trimethylsiloxy groups, methylhydrogensiloxane-methyl(triethoxysilylethyl)siloxane-methyl(3-glycidoxypropyl)siloxane copolymers capped at both molecular terminals with trimethylsiloxy groups, dimethylsiloxane-methylhydrogensiloxane-methyl(trimethoxysilylethyl)siloxane copolymers capped at both molecular terminals with trimethylsiloxy groups, dimethylsiloxane-methylhydrogensiloxane-methyl(triethoxysilylethyl) siloxane-methyl(3-glycidoxypropyl)siloxane copolymers capped at both molecular terminals with trimethylsiloxy groups, and mixtures of two or more types of these organopolysiloxanes. R' in the formulas above is a substituted or unsubstituted monovalent hydrocarbon group excluding alkenyl groups or a hydrogen atom, and examples of this monovalent hydrocarbon group include the alkyl groups, aryl groups, aralkyl groups, or halogenated alkyl groups described above. In particular, component (B) is preferably a mixture of an organopolysiloxane having silicon-bonded hydrogen atoms only at both molecular terminals and an organopolysiloxane having at least 3 silicon-bonded hydrogen atoms in a molecule due to the excellent mechanical characteristics—the elongation, in particular—of the cured product formed by the present composition.

A content of component (B) is preferably in an amount such that a quantity of silicon-bonded hydrogen atoms in component (B) is within the range of from 0.05 to 20 mol per 1 mol of alkenyl groups in component (A), preferably within the range of from 0.1 to 20 mol, and particularly preferably within the range of from 0.1 to 10 mol. If the content of component (B) is less than the lower limit of the range described above, the composition will tend not to be cured sufficiently, whereas if the content exceeds the upper limit of the range described above, the composition will tend to foam during curing, which diminishes the mechanical characteristics of the cured product formed by the composition.

Component (C) consists of the microparticles of the present invention using a hydrosilylation reaction catalyst as a catalyst.

A content of component (C) is not particularly limited but is preferably in an amount to promote crosslinking of the present composition by a hydrosilylation reaction. Specifically, it is preferable for the content to be in an amount such that the platinum metal in component (C) is within the range of from 0.1 to 10,000 ppm in weight units per the total amount of components (A) and (B). This is because if the content of component (C) is less than the lower limit of the range described above, the composition will tend not to cure sufficiently, whereas if the content exceeds the upper limit described above, the curing of the composition will not be promoted substantially.

The present composition contains components (A) to (C), but the composition may also further contain (D) a reaction inhibitor as an additional optional component for regulating the hydrosilylation reaction of the present composition. Examples of component (D) include acetylene alcohols such as 1-ethynyl-1-cyclohexanol, 2-methyl-3-butyn-2-ol, 2-phenyl-3-butyn-2-ol, 2-ethynylisopropanol, 2-ethynylbutan-2-ol, and 3,5-dimethyl-1-hexyn-3-ol; silylated acetylene alcohols such as trimethyl(3,5-dimethyl-1-hexyn-3-oxy)silane, methylvinylbis(3-methyl-1-butyn-3-oxy)silane, and ((1,1-dimethyl-2-propynyl)oxy)trimethylsilane; unsaturated carboxylic acid esters such as diallyl malate, dimethyl malate, diethylfumarate, diallyl fumarate, and bis(methoxyisopropyl)malate; conjugated ene-yne compounds such as 2-isobutyl-1-buten-3-yne, 3,5-dimethyl-3-hexen-1-yne, 3-methyl-3-penten-1-yne, 3-methyl-3-hexen-1-yne, 1-ethynylcyclohexene, 3-ethyl-3-buten-1-yne, and 3-phenyl-3-buten-1-yne; and alkenyl group-containing cyclic siloxanes such as 1,3,5,7-tetramethyl-1,3,5,7-tetravinylcyclotetrasiloxane. A content of component (D) is not particularly limited but is preferably within the range of from 0.001 to 5 parts by weight per 100 parts by weight of component (A).

The present composition may also contain (E) an inorganic filler to improve the mechanical strength of the cured product formed by the present composition as an additional optional component. Examples of component (E) include fumed silica, precipitated silica, titanium dioxide, carbon black, alumina, quartz powder, and inorganic fillers prepared by surface-treating these inorganic fillers with organic silicon compounds such as organoalkoxysilanes, organochlorosilanes, or organosilazanes. In the present composition, a content of component (E) is not particularly limited but is preferably less than 100 parts by weight and particularly preferably within the range of from 0.1 to 20 parts by weight per 100 parts by weight of component (A).

The curing of the present composition progresses as a result of heating, but the composition is preferably heated at a temperature greater than or equal to the melting point of the thermoplastic polyolefin resin in component (C) so that the composition can favorably adhere to various base materials. The form of the cured product formed by the curing of the present composition is preferably an elastomer and particularly preferably a gel or a rubber.

EXAMPLES

The microparticles containing a thermoplastic polyolefin resin and a platinum-based catalyst, and the curable organopolysiloxane composition of the present invention will be described hereinafter using practical examples.

Reference Example 1

A platinum catalyst (chloroplatinic acid aqueous solution (platinum content=33 weight %)) was mixed and dispersed in a polyethylene wax (POLYWAX (registered trademark) 1000 produced by the Baker Hughes Inc.) with an Mz of 3600 and Mz/Mw of 1.17, which was melted by heating at 150° C., so that the content was 0.5 weight %. This dispersed product was continuously sprayed into a spray dryer tank (produced by the Ashizawa Niro Atomizer Ltd.) with a hot air flow consisting of a nitrogen gas using a two-fluid nozzle. Here, the hot air flow temperature of the nitrogen gas was 95° C. at the inlet of the spray dryer and 45° C. at the outlet of the spray dryer, and the hot air flow rate was 1.3 m$^3$/min. After running for one hour, platinum catalyst-containing polyethylene wax microparticles were collected with a bag filter. The platinum content was converted based on the atomic weight of platinum. 10 g of the resulting microparticles were placed in 40 g of solvent and washed while stirring. Isopropyl alcohol (IPA) was used as the solvent. After the solvent was removed by centrifugation, the microparticles were dried by storing the microparticles for one week in an environment with a temperature of 25° C. and 50% relative humidity (RH) to obtain microparticles 1. The average particle diameter was 3.19 μm. The average particle diameter was measured with the method stipulated in JIS K 8825-1.An IA500 laser diffraction/scattering-type particle size analyzer manufactured by Horiba, Ltd. was used for measurements.

Reference Example 2

Microparticles 2 were obtained in the same manner as in the case of Reference Example 1 with the exception of controlling the platinum content to 0.2 weight %. The average particle diameter was 3.71 μm.

Reference Example 3

Microparticles 3 were obtained in the same manner as in the case of Reference Example 1 with the exception of controlling the platinum content to 1.0 weight %. The average particle diameter was 3.08 μm.

Reference Example 4

Microparticles 4 were obtained in the same manner as in the case of Reference Example 1 with the exception of controlling the platinum content to 0.2 weight % and eliminating the washing operation.

Reference Example 5

Microparticles 5 were obtained in the same manner as in the case of Reference Example 2 with the exception that the average particle diameter was 0.99 μm.

Reference Example 6

Microparticles 6 were obtained in the same manner as in the case of Reference Example 1 with the exception of changing the solvent used for washing from isopropyl alcohol to ethanol.

Reference Example 7

Microparticles 7 were obtained in the same manner as in the case of Reference Example 1 with the exception of adding a platinum catalyst to a polyethylene wax (POLYWAX (registered trademark) 2000 produced by the Baker Hughes Inc.) with an Mz of 7290 and Mz/Mw of 1.18 so that the platinum content was 0.6 weight %. The average particle diameter was 4.22 μm.

Reference Example 8

Microparticles 8 were obtained in the same manner as in the case of Reference Example 1 with the exception of adding platinum catalyst to a polyethylene wax (HW100P produced by Mitsui Chemicals Inc.) with an Mz of 5290 and Mz/Mw of 2.17 so that the platinum content was 0.5 weight %. The average particle diameter was 2.74 μm.

Reference Example 9

Microparticles 9 were obtained in the same manner as in the case of Reference Example 8 with the exception of controlling the platinum content to 0.2 weight %. The average particle diameter was 2.17 μm.

Reference Example 10

Microparticles 10 were obtained in the same manner as in the case of Reference Example 1 with the exception of adding a platinum catalyst to a polyethylene wax (POLYWAX (registered trademark) 655 produced by Baker Hughes Inc.) with a Mz of 2270 and Mz/Mw of 1.16 so that the platinum content was 0.4 weight %. The average particle diameter was 3.61 μm.

The microparticles 1 to 10 obtained as described above are shown in Table 2.

TABLE 2

| | | Microparticles | | | | | | | | | |
|---|---|---|---|---|---|---|---|---|---|---|---|
| | | 1 | 2 | 3 | 4 | 5 | 6 | 7 | 8 | 9 | 10 |
| Platinum catalyst-containing polyethylene wax microparticles | Melting point (° C.) | 113 | 113 | 113 | 113 | 113 | 113 | 126 | 119 | 119 | 99 |
| | Mz | 3600 | 3600 | 3600 | 3600 | 3600 | 3600 | 7290 | 5920 | 5920 | 2270 |
| | Mz/Mw | 1.17 | 1.17 | 1.17 | 1.17 | 1.17 | 1.17 | 1.18 | 2.17 | 2.17 | 1.16 |
| | Platinum concentration in the microparticles (weight %) | 0.5 | 0.2 | 1.0 | 0.2 | 0.2 | 0.5 | 0.6 | 0.5 | 0.2 | 0.4 |
| | Average particle diameter (μm) | 3.19 | 3.71 | 3.08 | 3.71 | 0.99 | 3.19 | 4.22 | 2.74 | 2.17 | 3.61 |
| | Washing solvent | IPA | IPA | IPA | None | IPA | Ethanol | IPA | IPA | IPA | IPA |

The curable organopolysiloxane compositions of Practical Examples 1 to 7 and Comparative Examples 1 to 4 were prepared as described below.

The components described below were mixed at the compounded amounts shown in Table 3 and lightly stirred. The content was in an amount such that, in the curable organopolysiloxane compositions, a quantity of silicon-bonded hydrogen atoms in component (B) was 1.8 mol per a total of 1 mol of vinyl groups in component (A-1), and components (C-1) to (C-11) were added last and stirred well. The characteristics of these compositions were evaluated in accordance with the methods described below. Results of the evaluation are shown in Table 3.

Component (A-1): Organopolysiloxane with a viscosity at 25° C. of 34,000 mPa·s (vinyl group content=0.6 weight %), comprising 73 weight % of a dimethylpolysiloxane capped at both molecular terminals with dimethylvinylsiloxy groups with a viscosity at 25° C. of 35,000 mPa·s, and 27 weight % of an organopolysiloxane represented by the average unit formula:

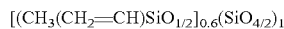

$$[(CH_3(CH_2=CH)SiO_{1/2}]_{0.6}(SiO_{4/2})_1$$

Component (B): A dimethylsiloxane-methylhydrogensiloxane copolymer capped at both molecular terminals with trimethylsiloxy groups with a viscosity at 25° C. of 5 mPa·s (silicon-bonded hydrogen atom content=0.7 weight %)
Component (C-1): Microparticles 1 prepared in Reference Example 1
Component (C-2): Microparticles 2 prepared in Reference Example 2
Component (C-3): Microparticles 3 prepared in Reference Example 3
Component (C-4): Microparticles 4 prepared in Reference Example 4
Component (C-5): Microparticles 5 prepared in Reference Example 5
Component (C-6): Microparticles 6 prepared in Reference Example 6
Component (C-7): Microparticles 7 prepared in Reference Example 7
Component (C-8): Microparticles 8 prepared in Reference Example 8
Component (C-9): Microparticles 9 prepared in Reference Example 9
Component (C-10): Microparticles 10 prepared in Reference Example 10
Component (C-11): 1,3-Divinyltetramethyldisiloxane solution of a 1,3-divinyltetramethylsiloxane platinum complex (platinum content=4.6 weight %)
Component (D): 2-Phenyl-3-butyn-2-ol
Component (E): Pulverized silica fine powder with an average particle diameter of 2 μm

[Evaluation of Curing Characteristics]

The curing characteristics of the resulting curable organopolysiloxane were confirmed with the method stipulated in JIS K 6300-2. The curing start time was determined by measuring the time required for the torque value to reach 10% when the torque after 60 minutes at 100° C. was defined as the maximum torque MH (60). A Curelastometer 5 (produced by Orientec Co., Ltd.) was used for measurements. The same composition as that used for the measurement of the curing start time described above was placed in a glass vial, sealed, and stored at 10° C. The curing start time was investigated six months later by performing the same measurements.

[Evaluation of Changes in Viscosity]

The viscosity was measured with the method stipulated in JIS Z 8803. An AR-550 rheometer (produced by TA Instruments) was used for measurements. The viscosity (in units of Pa·s) at a shear rate of 10 (1/S) was measured. The same composition as that used for the measurement of the viscosity described above was placed in a glass vial, sealed, and stored at 10° C. The viscosity was investigated six months later by performing the same measurements.

TABLE 3

| | | Practical Examples | | | | | | | Comparative Examples | | | |
|---|---|---|---|---|---|---|---|---|---|---|---|---|
| | | 1 | 2 | 3 | 4 | 5 | 6 | 7 | 1 | 2 | 3 | 4 |
| Composition (parts by weight) | Component (A-1) | 61.5 | 61.5 | 61.5 | 61.5 | 61.5 | 61.5 | 61.5 | 61.5 | 61.5 | 61.5 | 61.5 |
| | Component (B) | 3.5 | 3.5 | 3.5 | 3.5 | 3.5 | 3.5 | 3.5 | 3.5 | 3.5 | 3.5 | 3.5 |
| | Component (C-1) | 0.22 | — | — | — | — | — | — | — | — | — | — |
| | Component (C-2) | — | 0.55 | — | — | — | — | — | — | — | — | — |
| | Component (C-3) | — | — | 0.13 | — | — | — | — | — | — | — | — |
| | Component (C-4) | — | — | — | 0.53 | — | — | — | — | — | — | — |
| | Component (C-5) | — | — | — | — | 0.51 | — | — | — | — | — | — |
| | Component (C-6) | — | — | — | — | — | 0.21 | — | — | — | — | — |

TABLE 3-continued

|  |  | Practical Examples | | | | | | | Comparative Examples | | | |
|---|---|---|---|---|---|---|---|---|---|---|---|---|
|  |  | 1 | 2 | 3 | 4 | 5 | 6 | 7 | 1 | 2 | 3 | 4 |
|  | Component (C-7) | — | — | — | — | — | — | 0.30 | — | — | — | — |
|  | Component (C-8) | — | — | — | — | — | — | — | 0.25 | — | — | — |
|  | Component (C-9) | — | — | — | — | — | — | — | — | 0.55 | — | — |
|  | Component (C-10) | — | — | — | — | — | — | — | — | — | 0.3 | — |
|  | Component (C-11) | — | — | — | — | — | — | — | — | — | — | 0.023 |
|  | Component (D) | 0.02 | 0.02 | 0.02 | 0.02 | 0.02 | 0.02 | 0.02 | 0.02 | 0.02 | 0.02 | 0.02 |
|  | Component (E) | 35 | 35 | 35 | 35 | 35 | 35 | 35 | 35 | 35 | 35 | 35 |
| Curing start time (minutes) | Initial | 2.0 | 2.0 | 2.0 | 2.0 | 2.0 | 2.0 | 2.0 | 2.0 | 2.0 | 2.0 | 2.0 |
|  | After 6 months at 10° C. | 1.8 | 2.0 | 1.6 | 1.4 | 1.6 | 1.8 | 1.9 | 0.2 | 0.3 | Impossible to measure | Impossible to measure |
| Viscosity (Pa · s) | Initial | 50 | 50 | 50 | 50 | 50 | 50 | 50 | 50 | 50 | 50 | 50 |
|  | After 6 months at 10° C. | 55 | 51 | 60 | 65 | 50 | 54 | 50 | 200 | 180 | Cured | Cured |

INDUSTRIAL APPLICABILITY

The microparticles of the present invention are able to prevent or reduce increases in viscosity over time in a hydrosilylation reaction-curable organopolysiloxane composition and can therefore be suitably used as a catalyst for a one-component curable organopolysiloxane composition. The curable organopolysiloxane composition of the present invention can be stored for long periods of time and can be cured at relatively low temperatures, so the composition is easy to handle. Moreover, the curable organopolysiloxane composition of the present invention has excellent adhesiveness with respect to various base materials and is therefore suitable as, for example, a sealant for a case of an electronic product in automotive applications, an adhesive for electrical/electronic use, a potting agent, a protective coating, or an underfill agent.

The invention claimed is:

1. Microparticles comprising:
   at least one type of a platinum-based catalyst; and
   a thermoplastic polyolefin resin with a Z-average (Mz) molecular weight of at least 2500 and Mz/Mw of not more than 2.0,
   wherein the catalyst is dispersed in the thermoplastic polyolefin resin.

2. The microparticles according to claim 1, wherein a melting point of the thermoplastic polyolefin resin is from 40 to 200° C.

3. The microparticles according to claim 1, wherein the thermoplastic polyolefin resin is a polyolefin wax.

4. The microparticles according to claim 3, wherein the polyolefin wax is selected from the group consisting of polyethylene waxes, polypropylene waxes, polybutene waxes, and combinations thereof.

5. The microparticles according to claim 1, wherein an average particle diameter is from 0.01 to 500 μm.

6. The microparticles according to claim 1, wherein the catalyst is a hydrosilylation reaction catalyst.

7. The microparticles according to claim 6, wherein the platinum metal content of the catalyst is from 0.1 to 50.0 weight %.

8. A curable organopolysiloxane composition comprising:
   (A) an organopolysiloxane represented by the average unit formula:

$R_aSiO_{(4-a)/2}$ wherein, R is a substituted or unsubstituted monovalent hydrocarbon group, and "a" is a number from 1.0 to 2.3, and having at least an average of 1.5 alkenyl groups in a molecule;
   (B) an organopolysiloxane having at least an average of 1.5 silicon-bonded hydrogen atoms in a molecule; and
   (C) the microparticles described in claim 6.

9. The curable organopolysiloxane composition according to claim 8, wherein a content of component (B) is in an amount such that a quantity of silicon-bonded hydrogen atoms in component (B) is from 0.05 to 20 mol per 1 mol of alkenyl groups in component (A).

10. The curable organopolysiloxane composition according to claim 8, wherein a content of component (C) is in an amount to promote crosslinking of the composition by a hydrosilylation reaction.

11. The curable organopolysiloxane composition according to claim 8, further comprising (D) a reaction inhibitor in an amount of from 0.001 to 5 parts by weight per 100 parts by weight of component (A).

12. The microparticles according to claim 2, wherein an average particle diameter is from 0.01 to 500 μm.

13. The microparticles according to claim 3, wherein an average particle diameter is from 0.01 to 500 μm.

14. The microparticles according to claim 2, wherein the catalyst is a hydrosilylation reaction catalyst.

15. The microparticles according to claim 3, wherein the catalyst is a hydrosilylation reaction catalyst.

16. A curable organopolysiloxane composition comprising:
   (A) an organopolysiloxane represented by the average unit formula:

$R_aSiO_{(4-a)/2}$ wherein, R is a substituted or unsubstituted monovalent hydrocarbon group, and "a" is a number from 1.0 to 2.3, and having at least an average of 1.5 alkenyl groups in a molecule;
   (B) an organopolysiloxane having at least an average of 1.5 silicon-bonded hydrogen atoms in a molecule; and
   (C) the microparticles described in claim 7.

* * * * *